(12) United States Patent
Fuchie et al.

(10) Patent No.: US 12,355,674 B2
(45) Date of Patent: Jul. 8, 2025

(54) INFORMATION PROCESSING DEVICE, INFORMATION PROCESSING SYSTEM, AND INFORMATION PROCESSING METHOD FOR DATA CLASSIFICATION

(71) Applicant: SONY GROUP CORPORATION, Tokyo (JP)

(72) Inventors: Takaaki Fuchie, Tokyo (JP); Yoshinobu Kure, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 287 days.

(21) Appl. No.: 17/920,299

(22) PCT Filed: May 17, 2021

(86) PCT No.: PCT/JP2021/018564
§ 371 (c)(1),
(2) Date: Oct. 20, 2022

(87) PCT Pub. No.: WO2021/241299
PCT Pub. Date: Dec. 2, 2021

(65) Prior Publication Data
US 2023/0132800 A1    May 4, 2023

(30) Foreign Application Priority Data

May 25, 2020   (JP) ................................ 2020-090962

(51) Int. Cl.
*H04W 4/00*  (2018.01)
*H04L 47/25*  (2022.01)
*H04L 47/263*  (2022.01)
*H04L 47/762*  (2022.01)

(52) U.S. Cl.
CPC ............ *H04L 47/762* (2013.01); *H04L 47/25* (2013.01); *H04L 47/263* (2013.01)

(58) Field of Classification Search
CPC ...... H04L 47/25; H04L 47/263; H04L 47/762
See application file for complete search history.

(56) References Cited

U.S. PATENT DOCUMENTS

| 11,537,814 | B2* | 12/2022 | Inoshita ................. G06N 20/00 |
| 2009/0327918 | A1* | 12/2009 | Aaron ................... H04L 67/104 709/204 |

(Continued)

FOREIGN PATENT DOCUMENTS

| CA | 3110301 A1 | 3/2020 |
| CN | 102761480 A | 10/2012 |

(Continued)

*Primary Examiner* — Abdelnabi O Musa
(74) *Attorney, Agent, or Firm* — Paratus Law Group, PLLC

(57) ABSTRACT

An information processing device (500) includes a data classification unit (503) and a target transmission rate setting unit (504). The data classification unit (503) classifies a plurality of pieces of data transmitted via a network (300) into one or more groups based on a sharing state of a communication resource between the data. The target transmission rate setting unit (504) sets, for each group, a target transmission rate of each data belonging to the group based on a setting reference of the target transmission rate defined for each group.

17 Claims, 15 Drawing Sheets

(56) References Cited

U.S. PATENT DOCUMENTS

| | | | | |
|---|---|---|---|---|
| 2010/0195646 A1* | 8/2010 | Lee | .................... | H04L 1/007 |
| | | | | 714/776 |
| 2011/0202487 A1* | 8/2011 | Koshinaka | ............. | G06N 20/10 |
| | | | | 706/12 |
| 2013/0142045 A1* | 6/2013 | Nakamura | ......... | H04N 21/2381 |
| | | | | 370/230 |
| 2014/0204841 A1* | 7/2014 | Ruiz Delgado | ...... | H04B 7/0452 |
| | | | | 370/328 |
| 2016/0275346 A1* | 9/2016 | Liu | .................... | G06V 30/413 |
| 2017/0041652 A1* | 2/2017 | Ko | ..................... | H04N 19/132 |
| 2018/0092120 A1* | 3/2018 | Liu | .................... | H04W 72/54 |
| 2020/0342095 A1* | 10/2020 | Ijiro | ................... | G06F 21/55 |

FOREIGN PATENT DOCUMENTS

| | | |
|---|---|---|
| EP | 3820188 A1 | 5/2021 |
| JP | 2002-026986 A | 1/2002 |
| JP | 2011-223210 A | 11/2011 |
| JP | 2017-011547 A | 1/2017 |
| WO | WO-2020008800 A1 | 1/2020 |

\* cited by examiner

FIG.5

| NETWORK TYPE | PARAMETER | SUPPLEMENT |
|---|---|---|
| MOBILE NETWORK (LTE/5G) | Cell ID, Channel ID, ETC. OF MOBILE NETWORK. INTERNET CONNECTION POINT INFORMATION FROM MOBILE CORE NETWORK. Network Slicing INFORMATION (IN CASE OF 5G). | |
| WiFi | SSID OF ACCESS POINT, ETC. | |
| INTERNET ACCESS LINE | USE LINE INFORMATION | SET USE LINE INFORMATION IN ADVANCE. |
| DEDICATED LINE | USE LINE INFORMATION | SET USE LINE INFORMATION IN ADVANCE. |
| CLOSED NETWORK | NETWORK INFORMATION (DATA PATH INFORMATION, ETC.) | |

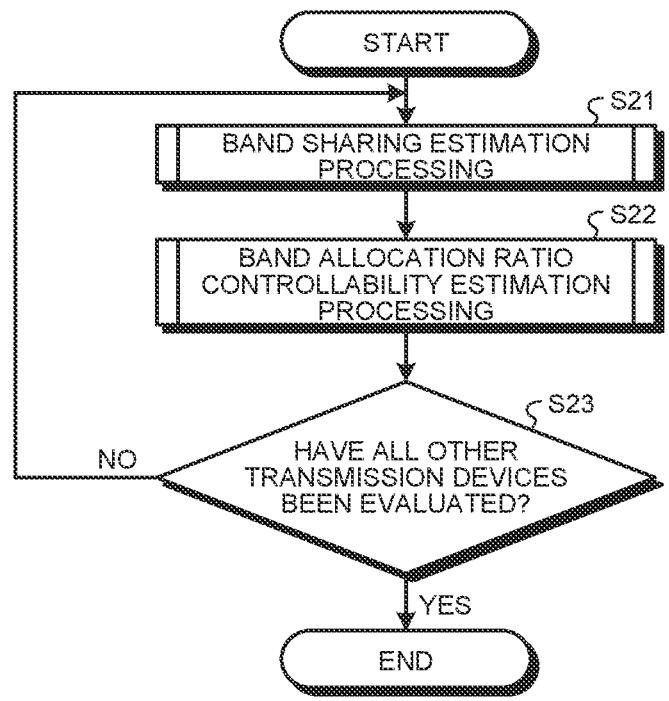

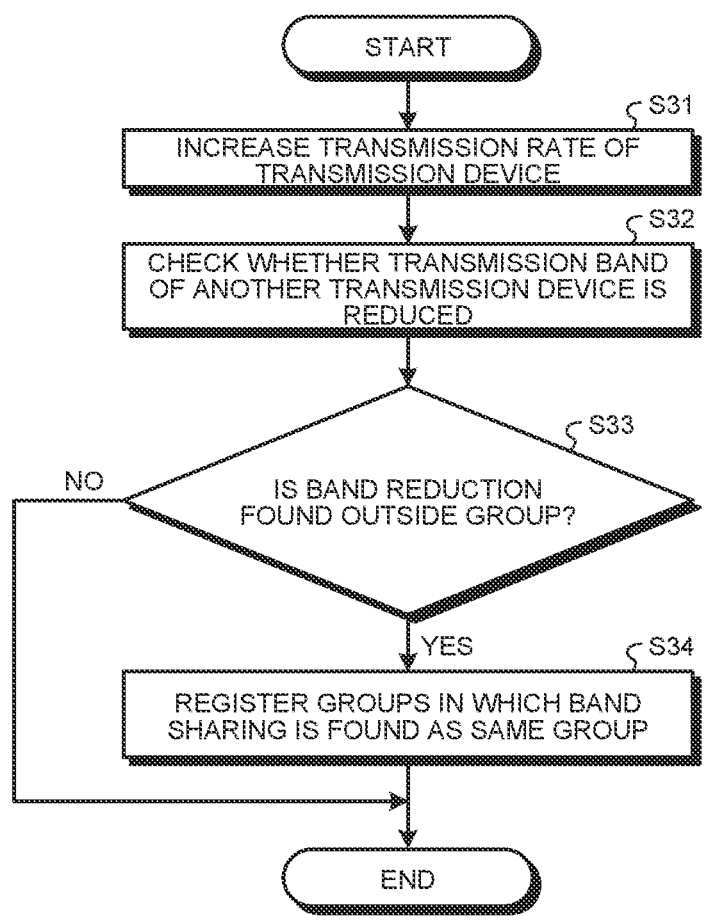

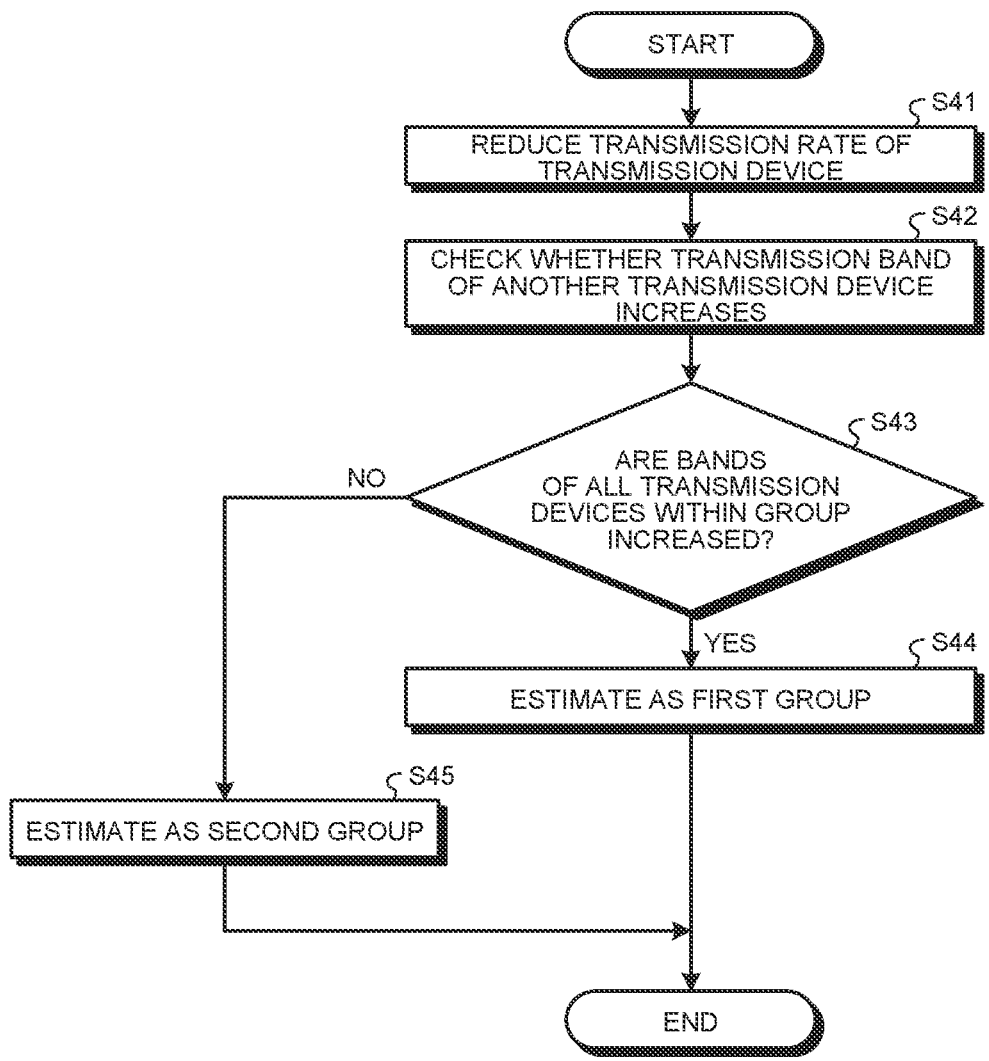

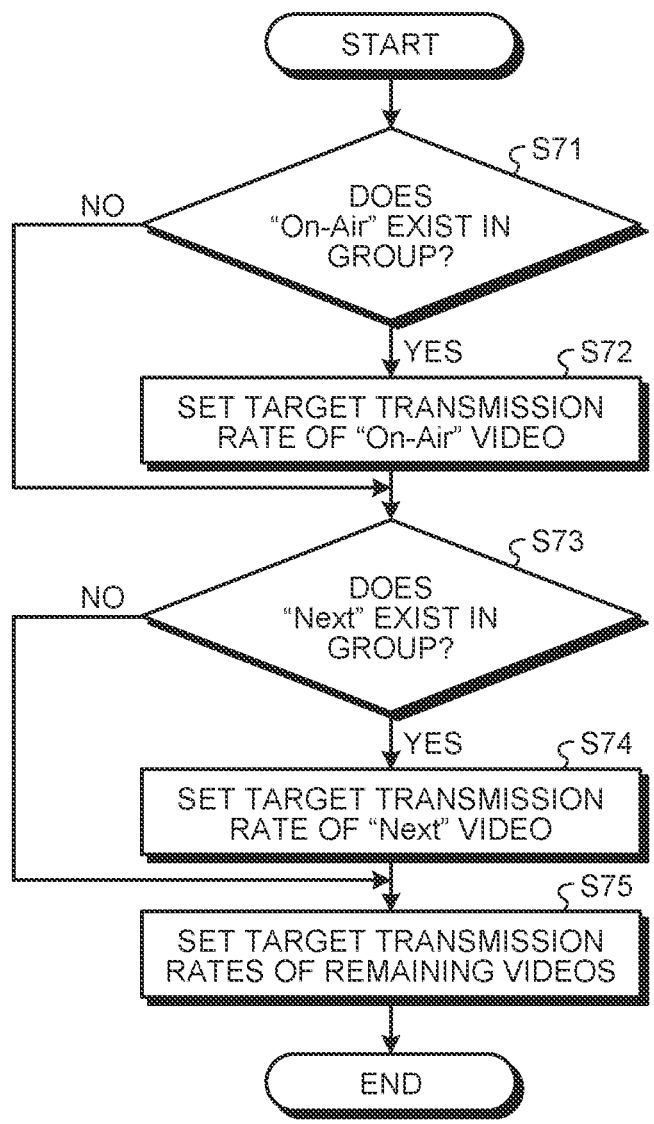

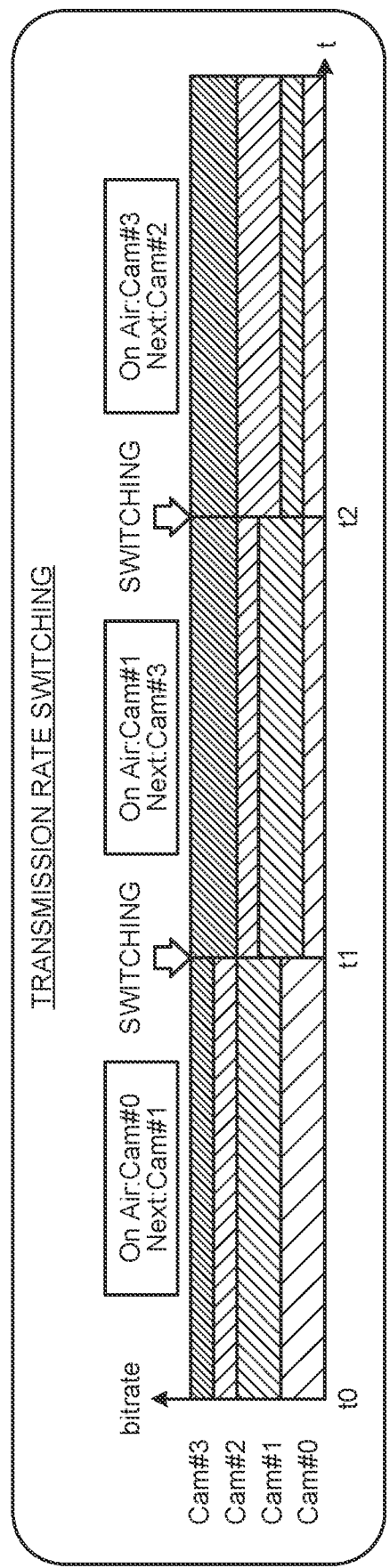

INFORMATION PROCESSING DEVICE, INFORMATION PROCESSING SYSTEM, AND INFORMATION PROCESSING METHOD FOR DATA CLASSIFICATION

CROSS REFERENCE TO PRIOR APPLICATION

This application is a National Stage Patent Application of PCT International Patent Application No. PCT/JP2021/018564 (filed on May 17, 2021) under 35 U.S.C. § 371, which claims priority to Japanese Patent Application No. 2020-090962 (filed on May 25, 2020), which are all hereby incorporated by reference in their entirety.

FIELD

The present invention relates to an information processing device, an information processing system, and an information processing method.

BACKGROUND

With the progress of communication technologies represented by the next-generation communication standard "5G", large-capacity and low-latency communication is being realized.

CITATION LIST

Patent Literature

Patent Literature 1: JP 2002-026986 A

SUMMARY

Technical Problem

In data communication, there is generally an upper limit to an available communication resource. Therefore, it is necessary to efficiently divide the limited communication resource to transmit data.

Therefore, the present disclosure proposes an information processing device, an information processing system, and an information processing method capable of efficiently dividing the communication resource to transmit data.

Solution to Problem

According to the present disclosure, an information processing device is provided that comprises: a data classification unit that classifies a plurality of pieces of data transmitted via a network into one or more groups based on a sharing state of a communication resource between the data; and a target transmission rate setting unit that sets, for each group, a target transmission rate of each data be to the group based on a setting reference of the target transmission rate defined for each group. According to the present disclosure, an information processing system is provided that comprises: a plurality of transmission devices; and the information processing device that sets each of target transmission rates of a plurality of pieces of data transmitted from the plurality of transmission devices. According to the present disclosure, an information processing method in which an information process of the information processing device is executed by a computer is provided.

BRIEF DESCRIPTION OF DRAWINGS

FIG. 5 is a diagram illustrating an example of parameters of a network.

FIG. 6 is a flowchart of second classification processing.

FIG. 7 is a flowchart illustrating an example of band sharing estimation processing.

FIG. 8 is a flowchart illustrating an example of band allocation ratio controllability estimation processing.

FIG. 14 is a flowchart of first band control

FIG. 15 is a diagram illustrating a state in which a bandwidth of data is switched according to a change in a role of the data.

DESCRIPTION OF EMBODIMENTS

Figure 1:
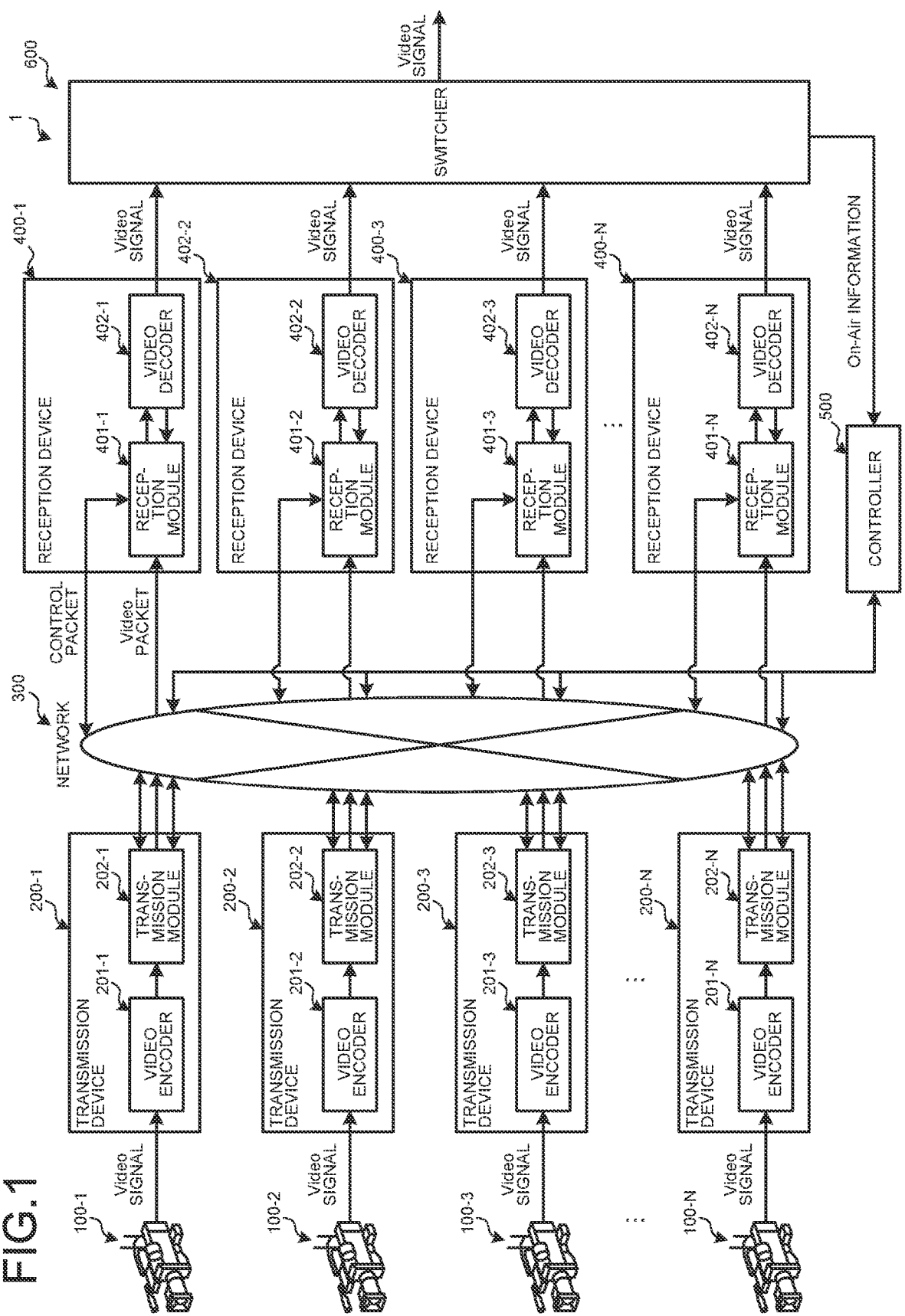
FIG. 1 is a schematic diagram of an information processing system.

Hereinafter, embodiments of the present disclosure will be described in detail with reference to the drawings. In the following embodiments, the same parts are denoted by the same reference numerals so that redundant description can be omitted.

The description will be given in the following order.
[1. Configuration of an information processing system]
[2. Configuration of a controller]
[3. Band sharing group determination processing]
 [3-1. Identification of a band sharing group based on network management information.]
 [3-2. Determination of a band sharing group type by band sharing estimation processing]
[4. Transmission rate control according to a band sharing group type]
[5. Effects]
[1. Configuration of an Information Processing System]

FIG. 1 is a schematic diagram of an information processing system 1.

Hereinafter, an example in which the information processing system 1 is applied to live video production will be described. The information processing system 1 includes a plurality of devices. When there are a plurality of devices of the same type, these devices are denoted by the same reference numerals. To distinguish the devices from each other, a number is added after the reference numeral indicating the device.

The term "band" as used herein means the amount of data that can be transmitted per unit time. "Sharing a band" means that a communication resource having a defined total band is shared by a plurality of pieces of data. That is, "sharing a band" means that the communication resource is divided and allocated to a plurality of pieces of data for transmission. The "band" in this case has the same meaning as the communication resource.

The information processing system 1 includes, for example, a plurality of cameras 100, a plurality of transmission devices 200, a plurality of reception devices 400, a controller 500, and a switches 600.

One transmission device 200 and one reception device 400 are provided for each camera 100. In the example of FIG. 1, N (N is an integer of 2 or more) pieces of cameras 100, N pieces of transmission devices 200, and N pieces of reception devices 400 are provided.

The transmission device 200 includes a video encoder 201 and a transmission module 202. The video encoder 201 encodes and compresses a video signal output from the camera 100. The transmission module 202 transmits video data (video packet) obtained from the compression to a network 300. The transmission module 202 monitors a state of the network 300 and determines a current transmission rate. The transmission module 202 instructs the video encoder 201 on encoding and the transmission rate, so that the data can be transmitted within a constant delay range.

The reception device 400 includes a reception module 401 and a video decoder 402. The reception module 401 receives data. (video packet) transmitted from the transmission device 200 via the network 300. The video decoder 402 extracts and decodes the video encoded data from the video packet, and restores the video signal. The video decoder 402 outputs the restored video signal to the switcher 600. The reception module 401 performs error correction and retransmission instruction, and corrects an error within a possible range.

The switcher 600 acquires a plurality of video signals output from the plurality of reception devices 400. A video signal output from another equipment (not illustrated) can be input to the switcher 600. The switcher 600 switches between the plurality of input video signals for broadcasting or distribution. The switcher 600 can also mix two or more video signals for broadcasting or distribution. The switcher 600 can also perform processing such as effect adding and caption multiplexing on an output video.

Conventionally, in live video production, a video captured by the camera 100 is transmitted to a broadcast video production device such as the switcher 600 using a dedicated cable to switch between videos to be transmitted and add a caption. In recent years, with the progress of communication technologies represented by the next-generation communication standard "5G", large-capacity and low-latency communication is being realized. The large-capacity and low-latency wireless communication enables video transmission by wireless low-latency streaming, which replaces conventional video transmission using a dedicated cable. This enables production with high mobility and low cost.

In addition, as large-capacity and low-latency communication is being realized regardless of wired or wireless communication, it is becoming possible to perform low-cost video production by transmitting a video captured by the camera 100 at a remote location to a production studio having production equipment or a data center providing a cloud service via the network 300 to produce a live video remotely.

In live video production, a plurality of cameras 100 are generally used to capture videos from various angles so that the videos are broadcast or distributed by appropriately switching between them. When the plurality of cameras 100 are used to capture videos, a larger band is necessary as the number of videos to be transmitted increases. However, the available band is often limited. Therefore, it is necessary to increase the compression rate in order to transmit more videos in the limited band. Nevertheless, increasing the compression ratio may deteriorate the image quality.

To solve this issue, the information processing system 1 detects a group of data transmitted along the same transmission path and sharing a band. The information processing system 1 groups the group of data sharing the band and allocates a bandwidth according to a role of each data in the same group. Then, the data is encoded and transmitted at a transmission rate corresponding to the allocated band. This reduces a deterioration in image quality of a video to be broadcast or distributed, leading to the production of a live video having high image quality.

That is, the information processing system 1 sets the transmission rate of the important video currently broadcast or distributed to be higher than that of the other videos by controlling the multiplexing rate of the plurality of videos. This reduces the deterioration in image quality of the video to be broadcast or distributed. What is important at this time is to grasp the connection state of the network 300 and to switch control according to whether to perform the multiplexing rate control, and this function is undertaken by the controller 500.

[2. Configuration of a Controller]

Figure 2:
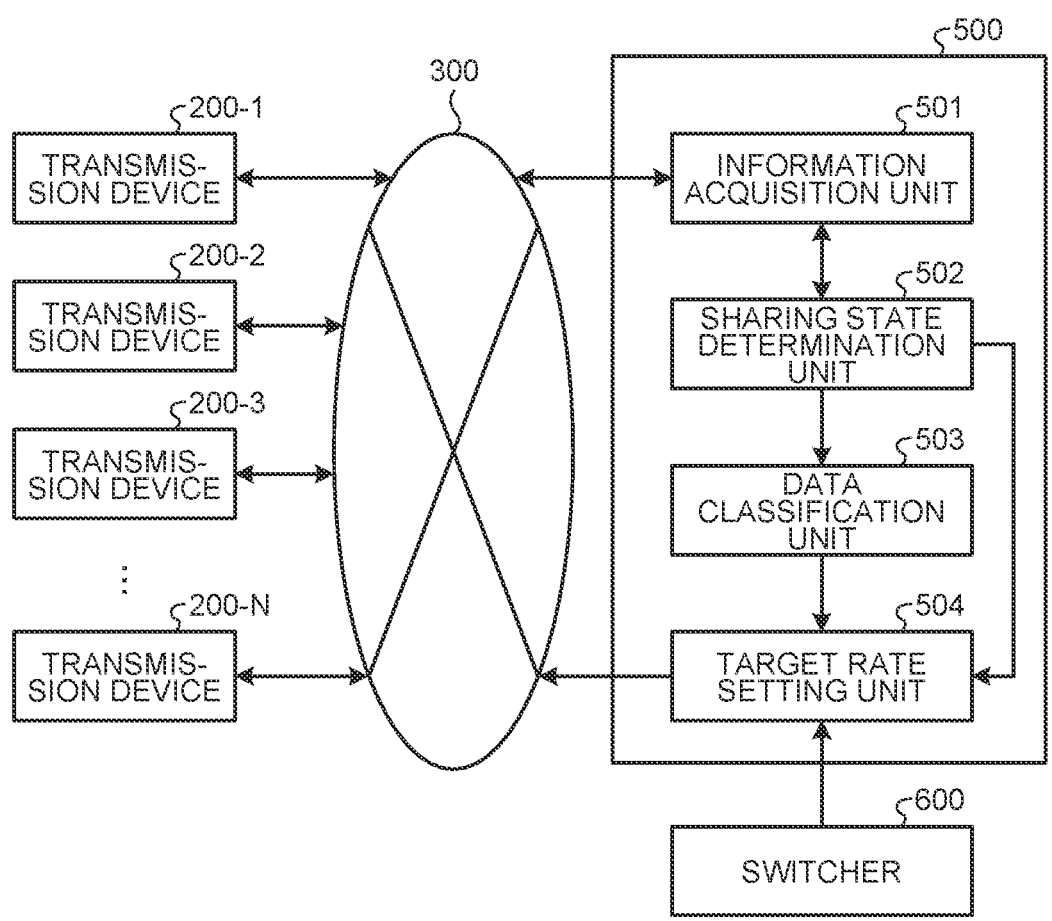
FIG. 2 is a schematic diagram of a controller.

FIG. 2 is a schematic diagram of the controller 500.

The controller 500 is an information processing device that processes information acquired from the transmission device 200 and the switcher 600 and controls various devices constituting the information processing system 1. The controller 500 sets the target transmission rate of each of the plurality of pieces of data transmitted from the plurality of transmission devices 200, based on the acquired information. The controller 500 includes, for example, an information acquisition unit 501, a sharing state determination unit 502, a data classification unit 503, and a target transmission rate setting unit 504.

The information acquisition unit 501 acquires information necessary for band sharing estimation from the transmission device 200. The sharing state determination unit 502 determines a sharing state of a band between data in the network 300 (sharing state of the communication resource) based on the acquired information. The data classification unit 503 classifies the plurality of pieces of data transmitted via the network 300 into one or more groups based on the sharing state of the band between the data.

The target transmission rate setting unit 504 sets, for each group, the target transmission rate of each data belonging to the group based on a setting reference of the target transmission rate defined for each group. For example, the target transmission rate setting unit 504 determines the role assigned to each of the plurality of pieces of data belonging to the same group based on the On-Air information from the switches 600. The target transmission rate setting unit 504 determines the size of the band to be allocated to each data according to the role of each data. The target transmission rate setting unit 504 sets the target transmission rate of each transmission device 200 based on the size of the band determined for each data. Each transmission device 200 transmits data in accordance with the state of the network 300, using the instructed target transmission rate as a target value.

Hereinafter, each processing executed by the controller 500 will be described.

[3. Band Sharing Group Determination Processing]

The N pieces of data transmitted from the N pieces of transmission devices 200 are classed into a plurality of groups by the data classification unit 503. In the present embodiment, for example, the plurality of pieces of data are classified into a band sharing group and a band non-sharing group according to the sharing state of the band. The band sharing group is a group in which the band is shared between the data. The band non-sharing group is a group in which the band is not shared between the data. The band sharing group is classified into two types according to whether or not a band allocation ratio can be controlled between the data (whether or not the band can be lent and borrowed).

As a result, the plurality of pieces of data are classified into three groups (a first group, second group, and third group). The first group is a group in which the band is shared between the data and the band allocation ratio can be controlled between the data (band sharing controllable). The second group is a group in which the band is shared between the data but the band allocation ratio cannot be controlled between the data (band sharing and uncontrollable). The third group is a group in which the band is not shared with any other data (no band sharing).

The target transmission rate setting unit 504 changes a method of setting the transmission rate according to the type of the band sharing group. For example, for the first group, the target transmission rate setting unit 504 determines the band to be allocated to each data according to the role of each data. The target transmission rate setting unit 504 dynamically changes the size of the band to be allocated to each data according to the change in the role of each data (first band control). For the second group, the target transmission rate setting unit 504 allocates a fixed band to each data according to a video profile (second band control). For the third group, the target transmission rate setting unit 504 individually sets the transmission rate of the data (third band control).

Which group the data belongs to is determined by, for example, two types of classification processing.

First, as first classification processing, the band sharing group is identified based on the network management information. The network management information includes, for example, information on a transmission path of data in the network 300. Specifically, the network management information includes a type of the network 300, a parameter of the network 300, and the like.

For example, the sharing state determination unit 502 determines the sharing state of the band between the data in the network 300 based on the transmission path of each data in the network 300. The sharing state determination unit 502 determines that a plurality of pieces of data whose type of the network 300 and parameter of the network 300 coincide with each other share the band. The data classification unit 503 classifies the plurality of pieces of data determined by the sharing state determination unit 502 to share the band into the same group.

Next, as second classification processing, the type of the band sharing group is determined by band sharing estimation processing. The band sharing estimation processing is processing of observing an influence of data transmission of a certain transmission device 200 on data transmission of another transmission device 200 and estimating the sharing state of the band between the data based on an observation result. An object of the band sharing estimation processing is to detect information about the sharing state of the band that cannot be found only from the network management information.

For example, if there is a correlation in a change in the band used between a plurality of pieces of data whose type of the network 300 and parameter of the network 300 do not coincide with each other, the sharing state determination unit 502 determines that the plurality of pieces of data share the band. The data classification unit 503 classifies a plurality of pieces of data belonging to the same group and having a correlation in the change in the band used into the first group. The data classification unit 503 classifies a plurality of pieces of data belonging to the same group and having no correlation in the change in the band used into the second group.

[3-1. Identification of a Band Sharing Group Based on Network Management Information]

Figure 3:
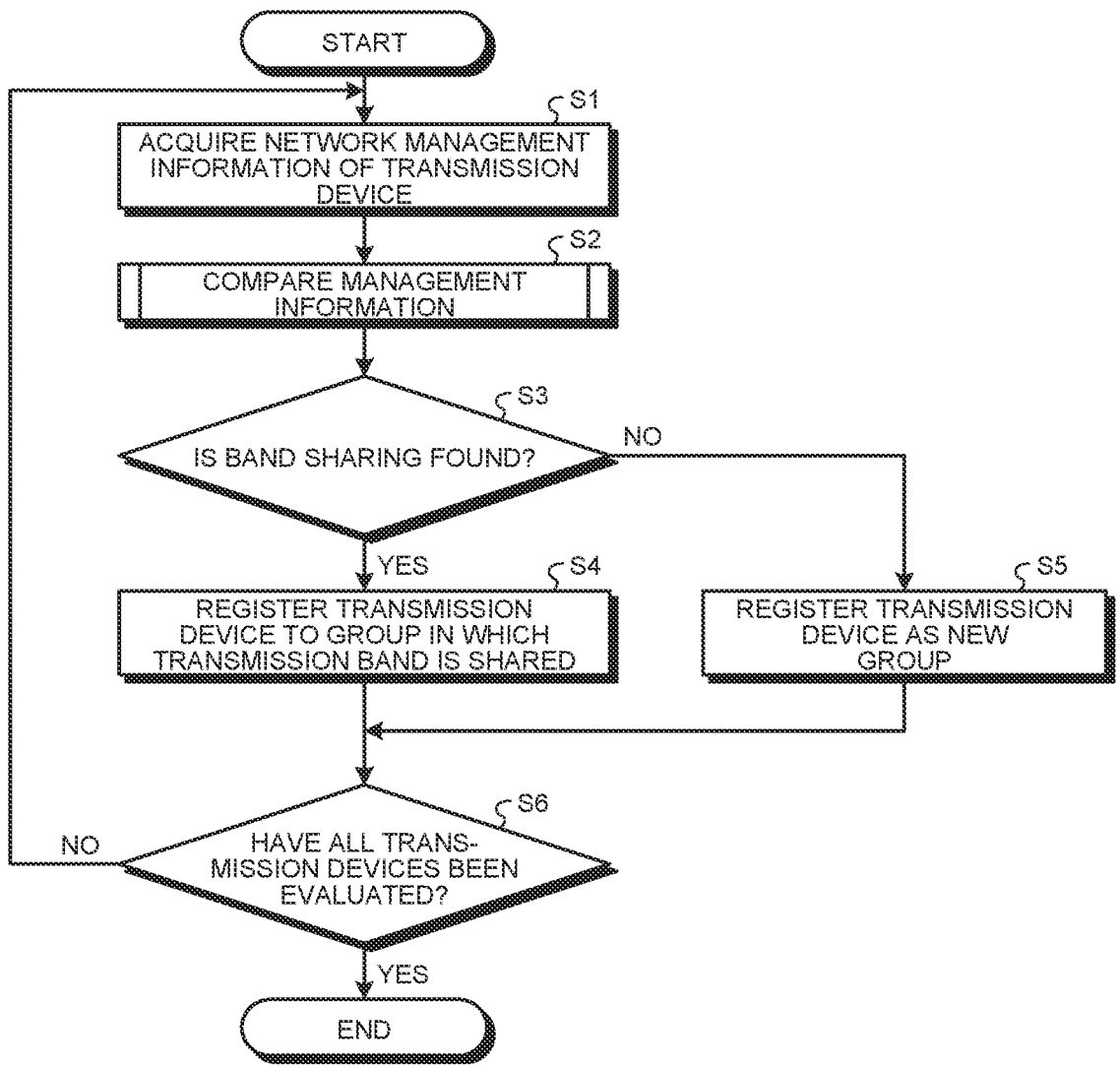
FIG. 3 is a flowchart of first classification processing.

FIG. 3 is a flowchart of first classification processing.

In Step S1, the information acquisition unit 501 acquires network management information of the network 300 used for transmission from a certain transmission device 200.

In Step S2, the sharing state determination unit 502 compares the network management information acquired from the certain transmission device 200 with network management information acquired from another transmission device 200. The other transmission device 200 used for the comparison is a transmission device 200 for which the group the transmitted data belongs to, that is, the band sharing group or the band non-sharing group, is known.

Figure 4:
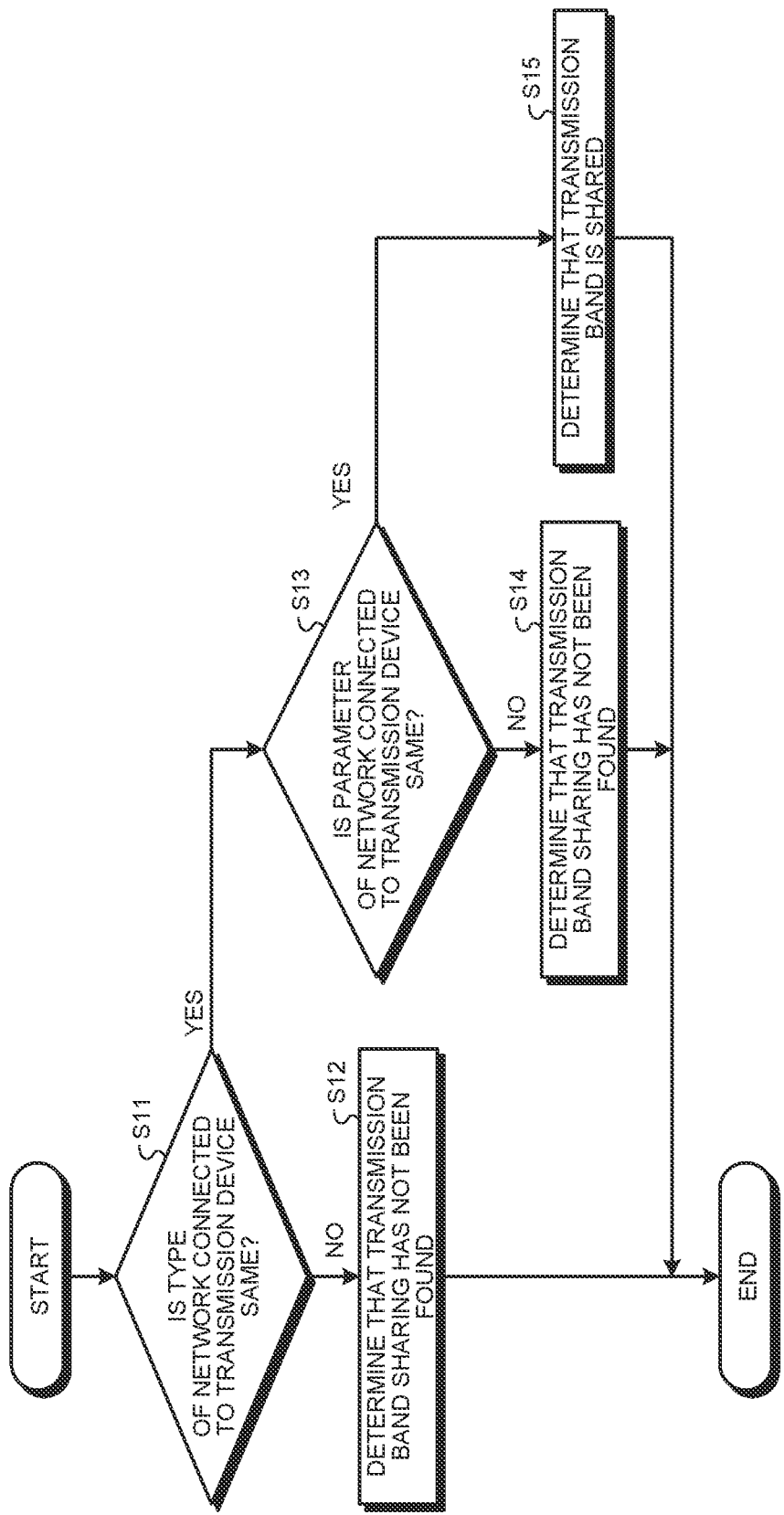
FIG. 4 is a flowchart illustrating an example of comparison processing of network management information.

FIG. 4 is a flowchart illustrating an example of the comparison processing of network management information as described in Step S2.

In Step S11, the sharing state determination unit 502 selects one transmission device 200 from among the N pieces of transmission devices 200. The sharing state determination unit 502 determines whether or not the type of the network 300 to which the selected transmission device 200 is connected is the same as the type of the network 300 to which the other transmission device 200 is connected. Examples of the type of the network 300 include a mobile network (LTE/5G), WiFi, an Internet access line, a dedicated line, a closed network, and the like.

When it is not determined in Step S11 that the type of the network 300 is the same (Step S11: No), the processing proceeds to Step S12. In Step S12, the sharing state determination unit 502 determines that band sharing has not been found, and ends the processing.

When it is determined in Step S11 that the type of the network 300 is the same (Step S11: Yes), the processing proceeds to Step S13. In Step S13, the sharing state determination unit 502 determines whether or not the parameter of the network 300 to which the selected transmission device 200 is connected is the same as the parameter of the network 300 to which the other transmission device 200 is connected.

Examples of the parameter of the network 300 include those described in FIG. 5. Examples of the parameter of the mobile network include cell ID and channel ID of the mobile network, Internet connection point information from the mobile core network, and network slicing information (in the case of 5G). An example of the parameter of Wifi is the SSID of the access point. An example of the parameter of the Internet access line is use line information. An example of the parameter of the dedicated line is use line information. An example of the closed network parameter is network information (such as data path information).

Back in FIG. 4, when it is not determined in Step S13 that the parameters are the same (Step S13: No), the processing proceeds to Step S14. In Step S14, the sharing state determination unit 502 determines that band sharing has not been found, and ends the processing When it is determined in Step S13 that the parameters are the same (Step S13: Yes), the processing proceeds to Step S15. In Step S15, the sharing state determination unit 502 determines that band sharing has been found, and ends the processing.

Back in FIG. 3, in Step S3, the sharing state determination unit 502 determines whether or not band sharing has been found between the data transmitted from the selected transmission device 200 and the data transmitted from the other transmission device 200.

When it is determined in Step S3 that band sharing has been found (Step S3: Yes), the processing proceeds to Step S4. In Step S4, the data classification unit 503 classifies the data transmitted from the selected transmission device 200 into the same group as the group to which the data transmitted from the other transmission device 200 belongs.

When it is not determined in Step S3 that band sharing has been found (Step S3: No), the processing proceeds to Step S5. In Step S5, the data classification unit 503 registers the data transmitted from the selected transmission device 200 to a new group. When there is no classified data in Step S2, the determination result of Step S3 is No.

When the processing of Steps S4 and S5 ends, the processing proceeds to Step S6. In Step S6, the data classification unit 503 determines whether or not the above-described evaluation has been performed for all the transmission devices 200.

When it is determined in Step S6 that the above-described evaluation has been performed for all the transmission devices 200 (Step S6: Yes), the processing ends. When it is not determined in Step S4 that the above-described evaluation has been performed for all the transmission devices 200 (Step S6: No), the processing returns to Step S1. Then, the processing is repeated until the above-described evaluation is performed for all the transmission devices 200.

[3-2. Determination of a Band Sharing Group Type By Band Sharing Estimation Processing]

FIG. 6 is a flowchart of second classification processing.

In Step S21, the controller 500 performs the band sharing estimation processing. An object of the band sharing estimation processing is to detect information about the sharing state of the band that cannot be detected by the first classification processing (identification of the band sharing group based on the network management information).

FIG. 7 is a flowchart illustrating an example of the band sharing estimation processing.

In Step S31, the sharing state determination unit 502 selects one transmission device 200 from among the N pieces of transmission devices 200. The sharing state determination unit 502 increases the transmission rate of the selected transmission device 200.

In Step S32, the sharing state determination unit 502 checks whether the transmission bands of (N−1) pieces of the other transmission devices 200 have decreased. The decrease in the transmission band is detected based on an increase in a packet loss rate, a decrease in a receiving side throughput, an increase in a delay, and the like.

In Step S33, the sharing state determination unit 502 determines whether or not the band decrease has been found in one or more transmission devices 200 having a different group to which the data belongs from that of the selected transmission device 200, among (N−1) pieces of the other transmission devices 200.

When it is determined in Step S33 that band decrease has been found (Step S33: Yes), the processing proceeds to Step S34. In Step S34, the data classification unit 503 determines that band sharing has been found between the data of the selected transmission device 200 and the data of the group in which band decrease has occurred in conjunction with the increase in the transmission rate of the selected transmission device 200. Then, the data classification unit 503 registers the groups in which band sharing has been found as the same group, and ends the processing.

When it is not determined in Step S33 that band decrease has been found (Step S33: No), the data classification unit 503 maintains the classification results of the data.

Back in FIG. 6, when the band sharing estimation processing of Step S21 ends, the processing proceeds to Step S22. In Step S22, the controller 500 performs band allocation ratio controllability estimation processing. The band allocation ratio controllability estimation processing is performed for the purpose of checking whether the band allocation ratio can be controlled between a plurality of pieces of data sharing the band in the same group.

Figure 9:
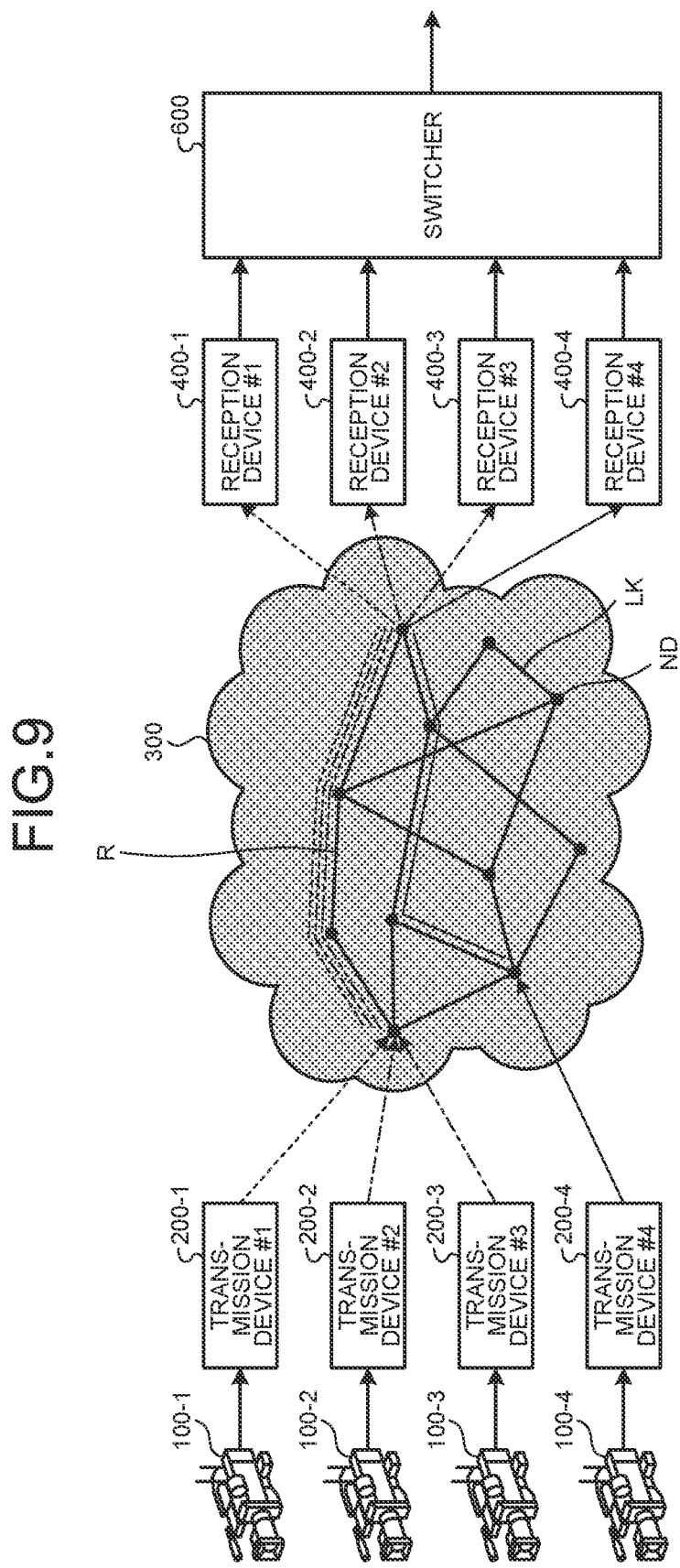
FIG. 9 is a diagram illustrating a state in which a band is shared by a plurality of pieces of data.
Figure 10:
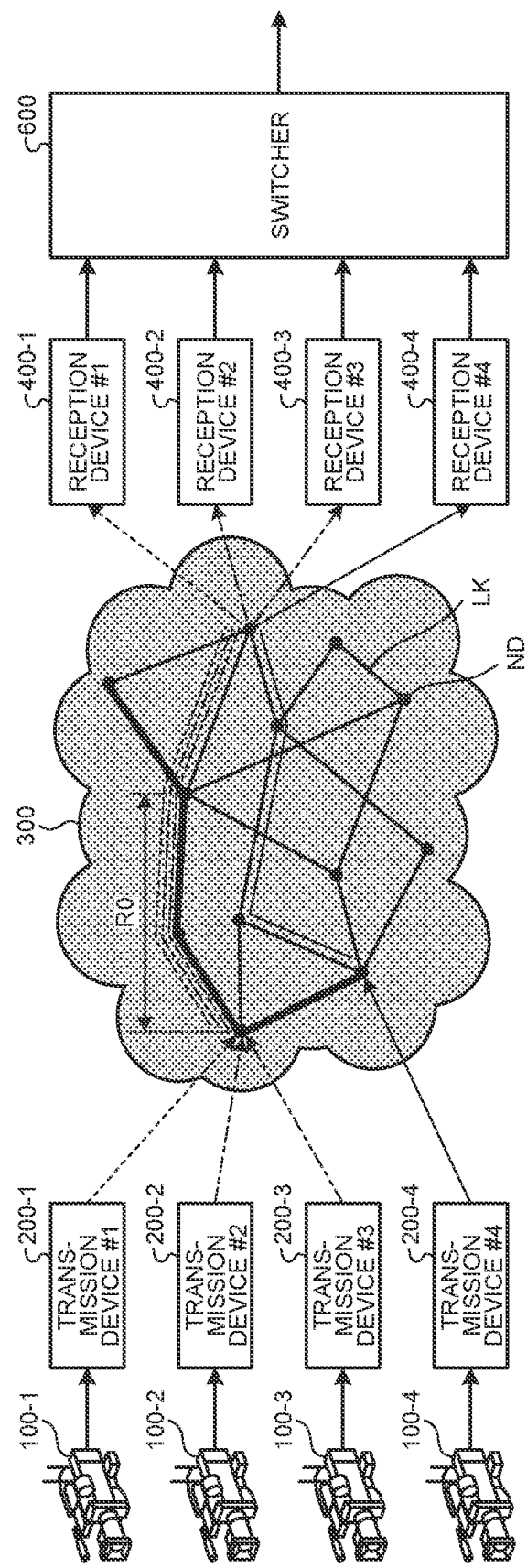
FIG. 10 is a diagram illustrating a state in which a band is shared by a plurality of pieces of data.

FIGS. 9 and 10 are diagrams illustrating a state in which a band is shared by a plurality of pieces of data.

In the example of FIG. 9, data transmitted from the transmission device 200-1, data transmitted from the transmission device 200-2, and data transmitted from the transmission device 200-3 are transmitted along the same transmission path R. The transmission path R includes nodes ND and links LK of the network 300. A plurality of pieces of data whose transmission paths R are partially or entirely equal share a band. Therefore, in FIG. 9, the data transmitted from the transmission device 200-1, the data transmitted from the transmission device 200-2, and the data transmitted from the transmission device 200-3 share a band.

The data transmitted from the transmission device 200-1, the data transmitted from the transmission device 200-2, and the data transmitted from the transmission device 200-3 do not share the band with data from another equipment. Therefore, the band allocation ratio can be controlled among the data transmitted from the transmission device 200-1, the data transmitted from the transmission device 200-2, and the data transmitted from the transmission device 200-3.

In the example of FIG. 10, the transmission patch R of the data transmitted from the transmission device 200-1, the data transmitted from the transmission device 200-2, and the data transmitted from the transmission device 200-3 overlaps with that of the data transmitted from another equipment in a section R0. In this case, even if the band of data of a certain transmission device 200 is reduced, the band of another transmission device 200 may not be increased because the band that becomes available after the reduction is used by the other equipment. Therefore, the band allocation ratio cannot be controlled between the data of the selected transmission device 200 and the data of the other transmission device 200.

As described above, even when a plurality of pieces of data share a band, there is the case where the band allocation ratio cannot be controlled between the data. The controller 500 estimates whether the band allocation ratio can be controlled between a plurality of pieces of data sharing a band in the same group according to the band allocation ratio controllability estimation processing.

FIG. 8 is a flowchart illustrating an example of the band allocation ratio controllability estimation processing.

In Step S41, the sharing state determination unit 502 selects one transmission device 200 from among the N pieces of transmission devices 200 and reduces the transmission rate of the selected transmission device 200.

In Step S42, the sharing state determination unit 502 checks whether or not the bands of data of (N−1) pieces of the other transmission devices 200 whose transmission rate have not been reduced have increased. The increase in the band is detected based on a decrease in the packet loss rate, an increase in the receiving side throughput, a decrease in the delay, and the like.

In Step S43, the sharing state determination unit 502 determines whether or not the bands of all the data belonging to the same group as that of the data of the selected transmission device 200 have increased.

When it is determined in Step S43 that the bands of all the other data of the same group have increased (Step S43: Yes), the processing proceeds to Step S44. In Step S43, the data classification unit 503 estimates the group to which the data of the selected transmission device 200 belongs as the first group in which the band allocation ratio is controllable, and ends the processing.

When it is not determined in Step S43 that the bands of all the other data of the same group have increased (Step S43: No), the processing proceeds to Step S45. In Step S45, the data classification unit 503 estimates the group to which the data of the selected transmission device 200 belongs as the second group in which the band allocation ratio is uncontrollable, and ends the processing.

Figure 11:
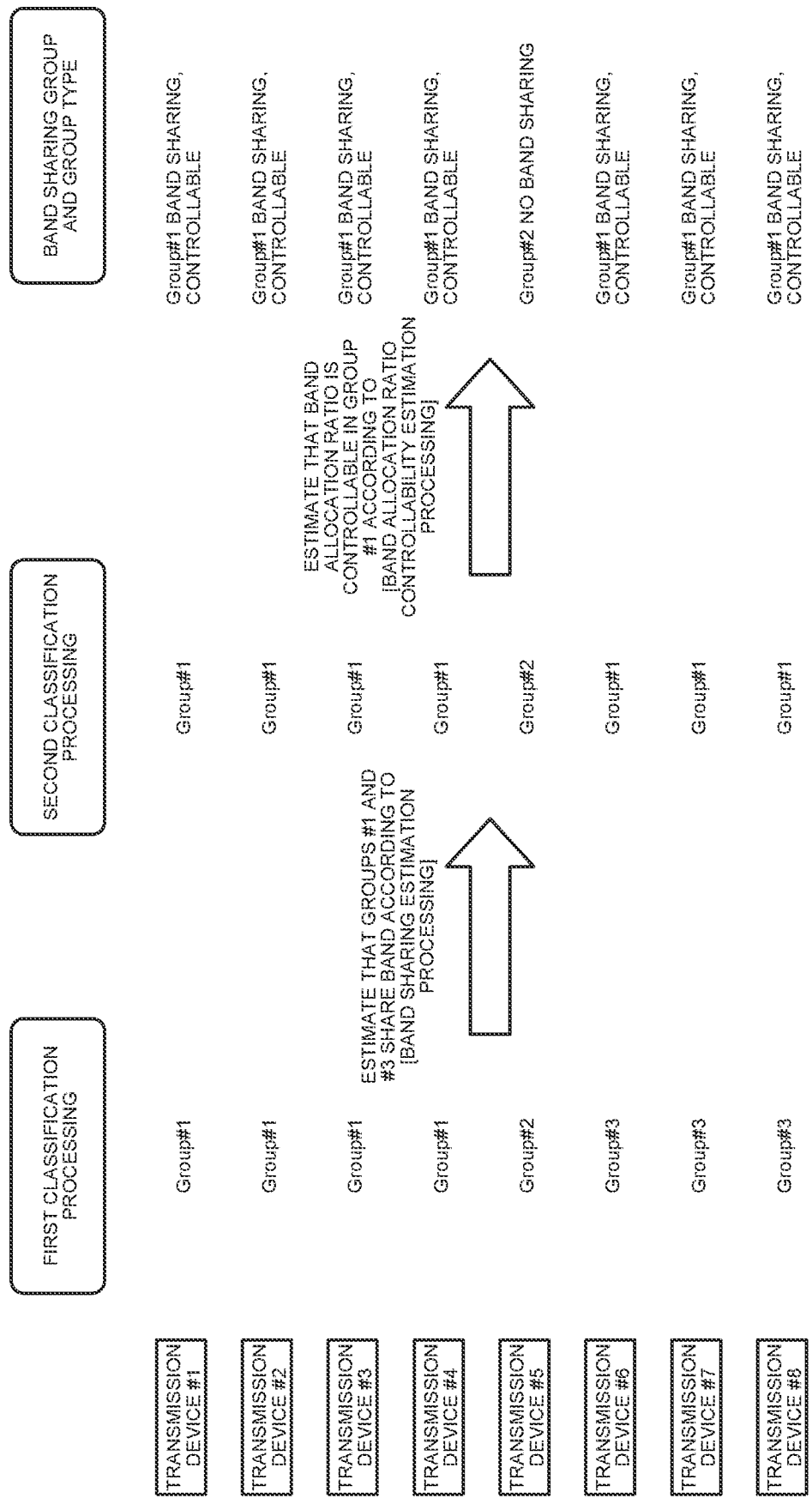
FIG. 11 is a diagram illustrating a specific example of data classification processing.

FIG. 11 is a diagram illustrating a specific example of the data classification processing. In FIG. 11, the above-described classification processing is applied to a system including eight transmission devices.

Data transmitted from the eight transmission devices is classified into two band sharing groups (Group #1 and Group #3) and one band non-sharing group (Group #2) based on the network management information.

After the classification based on the network management information is performed, the band sharing estimation processing is performed on the two band sharing groups (Group #1 and Group #3). As a result of the band sharing estimation processing, it is estimated that two band sharing groups (Group #1 and Group #3) share a band. Therefore, Group #3 is re-registered as Group #1.

Then, the band allocation ratio controllability estimation processing is performed on Group #1 to determine the type of the band sharing group. As a result of the band allocation ratio controllability estimation processing, it is determined that Group #1 is a group in which the band allocation ratio is controllable. As a result, the data transmitted from the eight transmission devices is classified into Group #1 (a group in which the pieces of data share the band and the band allocation ratio can be controlled between the data) and Group #2 (a group that does not share a band with any other data).

[4. Transmission Rate Control According to a Band Sharing Group Type]

Figure 12:
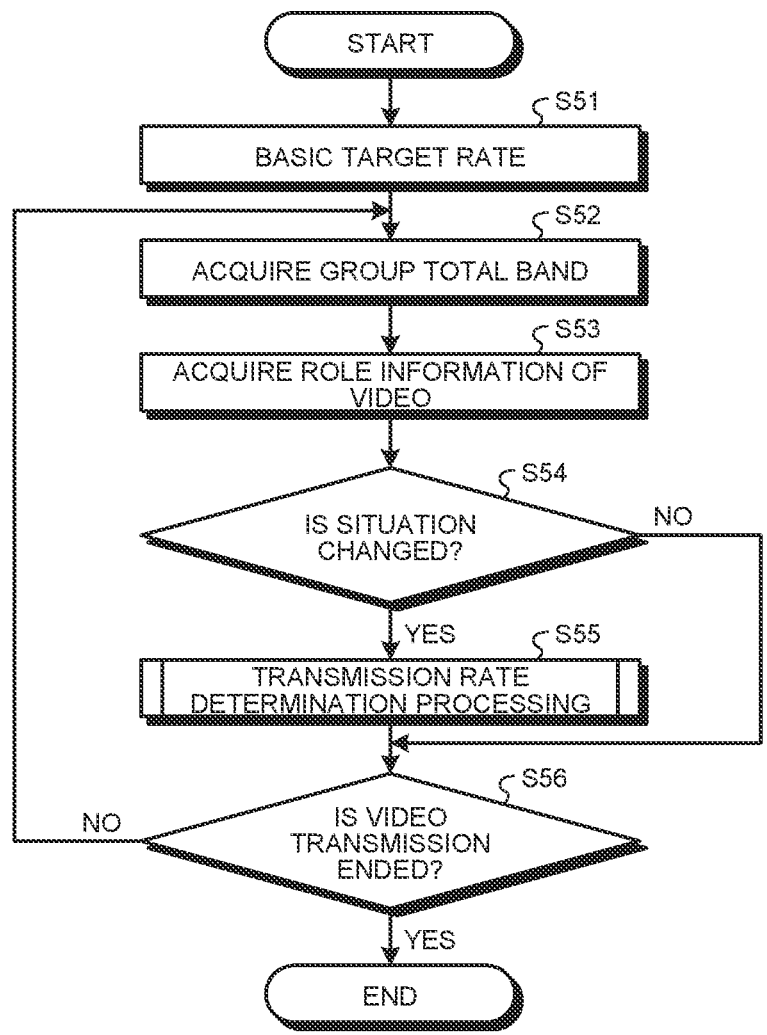
FIG. 12 is a flowchart illustrating a method of controlling a transmission rate.

FIG. 12 is a flowchart illustrating a method of controlling the transmission rate. In FIG. 12, for example, processing of allocating more bandwidth of the total band of a group to data of an "On-Air video" and data of a "Next video" scheduled to be on the air next is performed for the group in which the band allocation ratio is controllable. This processing improves the image quality of the video to be broadcast or distributed.

In Step S51, the target transmission rate setting unit 504 sets, for each data (video), a transmission rate at which the expected image quality is obtained as a basic target transmission rate. The basic target transmission rate of each data may be set to the same value. When the transmission rate necessary for obtaining the expected image quality differs depending on each data due to the video profile such as the video size (HD, 4K, etc.) and the camera arrangement, the basic target transmission rate may be different depending on each data.

In Step S52, the sharing state determination unit 502 calculates, for each group, the total band of the network shared by the plurality of pieces of data in the group (group total band). For example, the sharing state determination unit 502 can identify the transmission path of each data from the network management information and calculate the group total band from the specification of the transmission path of each data. Alternatively, the sharing state determination unit 502 may acquire the transmittable rate detected from each transmission device 200 and calculate the group total band based on each of the acquired transmittable rates. The target transmission rate setting unit 504 acquires the group total band of each group from the sharing state determination unit 502.

In Step S53 the target transmission rate setting unit 504 acquires information on which video data is selected as the "On-Air video" or the "Next video" from the switcher 600. The "On-Air video" is a video that is currently being broadcast or distributed, output from the switcher 600. The "Next video" is a video that is scheduled to be broadcast or distributed next, output from the switcher 600.

In Step S54, the target transmission rate setting unit 504 determines whether or not the situation has changed. Examples of the change in the situation detected by the target transmission rate setting unit 504 include a change in the role information of the video and a change in the group total band. The target transmission rate setting unit 504 checks the situation at constant time intervals.

When it is determined in Step S54 that the situation has changed (Step S54: Yes), the processing proceeds to Step S55. In Step S55, the target transmission rate setting unit 504 determines the target transmission rate of each video. The target transmission rate setting unit 504 sets the transmission rate of each transmission device 200 using the determined target transmission rate.

Figure 13:
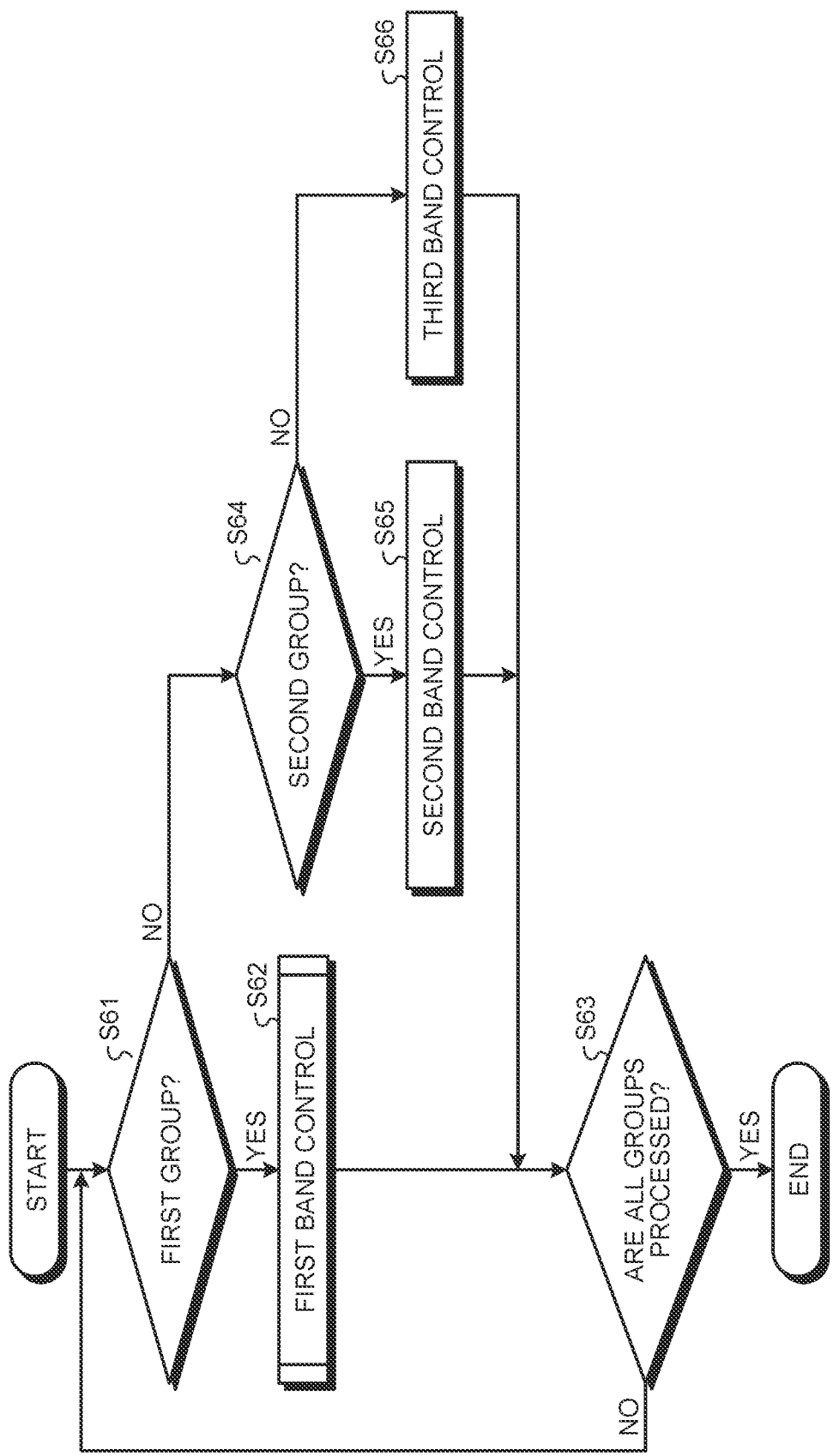
FIG. 13 is a flowchart illustrating a method of determining a target transmission rate.

FIG. 13 is a flowchart illustrating a method of determining the target transmission rate.

In Step S61, the target transmission rate setting unit 504 acquires data classification information. (information indicating which group each data belongs to) from the data classification unit 503. The target transmission rate setting unit 504 selects one group from the plurality of groups classified by the data classification unit 503, and determines whether or not the selected group corresponds to the first group in which the band allocation ratio is controllable.

When it is determined in Step S61 that the selected group corresponds to the first group (Step S61: Yes), the processing proceeds to Step S62. In Step S62, the target transmission rate setting unit 504 sets the target transmission rate of each data based on the first band control. Each transmission device 200 performs transmission using the target transmission rate set based on the first band control as a target value. Each transmission device 200 monitors the state of the network 300, and if the transmission band cannot be secured, performs transmission by reducing the transmission rate to an appropriate rate as necessary.

FIG. 14 is a flowchart of the first band control.

In Step S71, the target transmission rate setting unit 504 determines whether or not the "On-Air video" exists in the group.

When it is determined in Step S71 that the "On-Air video" exists in the group (Step S71: Yes), the processing proceeds to Step S72. In Step S72, the target transmission rate setting unit 504 sets the target transmission rate of the "On-Air video".

Here, first, the target transmission rate setting unit 504 calculates the maximum transmission rate that can be allocated to the "On-Air video" (an allocatable rate). The allocatable rate of the "On-Air video" is obtained by subtracting the lowest rates of the remaining data from the group total band (allocatable rate=group total band—lowest rate×the number of pieces of remaining data in the group).

The lowest rate is preset by the user as minimum band for preventing the band of the remaining data from becoming zero. Next, the target transmission rate setting unit 504 sets a smaller one of the basic target transmission rate and the allocatable rate of the "On-Air video" as the target transmission rate of the "On-Air video".

After the target transmission rate of the "On-Air video" is set Step S72, or when it is not determined in Step S71 that the "On-Air video" exists in the group (Step S71: No), the processing proceeds to Step S73. In Step S73, the target transmission rate setting unit 504 determines whether or not the "Next video" exists in the group.

When it is determined in Step S73 that the "Next video" exists in the group (Step S73: Yes), the processing proceeds to Step S74. In Step S74, the target transmission rate setting unit 504 sets the target transmission rate of the "Next video".

Here, first, the target transmission rate setting unit 504 calculates an allocatable rate of the "Next video". The allocatable rate of the "Next video" is obtained by subtracting the target transmission rate of the "On-Air video" and the lowest rates of the remaining data from the group total band (allocatable rate=group total band—target transmission rate of "On-Air video"—lowest rate×the number of pieces of remaining data in the group). Next, the target transmission rate setting unit 504 sets a smaller one of the basic target transmission rate and the allocatable rate of the "Next video" as the target transmission rate of the "Next video".

After the target transmission rate of the "Next video" is set in Step S74, or when it is not determined in Step S73 that the "Next video" exists in the group (Step S73: No), the processing proceeds to Step S75. In Step S75, the target transmission rate setting unit 504 sets the target transmission rates of the remaining data in the group.

Here, first, the target transmission rate setting unit 504 calculates an allocatable rate of the remaining data other than the "On-Air video" and the "Next video". The allocatable rate of the remaining data is obtained by subtracting the target transmission rate of the "On-Air video" and the target transmission rate of the "Next video" from the group total band (allocatable rate—group total band—target transmission rate of the "On-Air video"—target transmission rate of the "Net video"). Next, the target transmission rate setting unit 504 divides the allocatable rate of the remaining data by the number of pieces of remaining data. The target transmission rate setting unit 504 sets the divided allocatable rate as the target transmission rate of each remaining data. For example, the target transmission rate setting unit 504 can proportionally allocate the allocatable rate based on the basic target transmission rate of each data (target transmission rate=basic target transmission rate×remainder of group total band/sum of basic target transmission rates).

The target transmission rate setting unit 504 dynamically changes the target transmission rate of each data belonging to the first group according to the role of each data.

Back in FIG. 13, when it is not determined in Step S61 that the selected group corresponds to the first group (Step S61: No), the processing proceeds to Step S64. In Step S64, the target transmission rate setting unit 504 determines whether or not the selected group corresponds to the second group in which the band allocation ratio is uncontrollable.

When it is determined in Step S64 that the selected group corresponds to the second group (Step S64: Yes), the processing proceeds to Step S65. In Step S65, the target transmission rate setting unit 504 sets the target transmission rate of each data based on the second band control. Each transmission device 200 performs transmission using the target transmission rate set based on the second band control as a target value. Each transmission device 200 monitors the state of the network 300, and if the transmission band cannot be secured, performs transmission by reducing the transmission rate to an appropriate rate as necessary.

In the second band control, the target transmission rate setting unit 504 allocates a fixed band to each data based on the basic target transmission rate set in advance. The target transmission rate setting unit 504 sets the target transmission rate of all the data belonging to the second group based on a fixed ratio regardless of the role of each data. However, when the sum of the basic target transmission rates of the data in the group exceeds the group total band, the data compete with each other for the band, resulting in an unstable operation. Therefore, when the sum of the basic target transmission rates of the data in the group exceeds the group total band, the target transmission rate setting unit 504 proportionally divides the group total band based on the basic target transmission rate of each data. The target transmission rate setting unit 504 sets the band obtained by proportionally div ding the total band of the group for each data as the target transmission rate of the data (target transmission rate=basic target transmission rate×group total band/sum of basic target transmission rates).

When it is not determined in Step S64 that the selected group corresponds to the second group (Step S64: No), the processing proceeds to Step S66. In Step S66, the target transmission rate setting unit 504 sets the target transmission rate of each data based on the third band control. In the third band control, the target transmission rate setting unit 504 sets the basic target transmission rate set in advance as the target transmission rate. Each transmission device 200 performs transmission using the target transmission rate set based on the third band control as a target value. Each transmission device 200 monitors the state of the network 300, and if the transmission band cannot be secured, performs transmission by reducing the transmission rate to an appropriate rate as necessary.

When the setting of the target transmission rate based on the first band control in Step S62, the second band control in Step S65, or the third band control in Step S66 is completed, the processing proceeds to Step S63. In Step S63, the target transmission rate setting unit 504 determines whether or not the target transmission rate has been set for all the groups classified by the data classification unit 503.

When it is determined in Step S63 that the target transmission rate has been set for all the groups (Step S63: Yes), the processing ends. When it is not determined in Step S63 that the target transmission rate has been set for all the groups (Step S63: No), the processing returns to Step S61, and the processing of Step S61 and the subsequent steps is repeated until the target transmission rate is set for all the groups.

Back in FIG. 12, when the target transmission rate is set in Step S55 or when it is not determined in Step S54 that the situation has changed (Step S54: No), the processing proceeds to Step S56. In Step S56, the target transmission rate setting unit 504 determines whether or not the transmission of the video has ended based on the data acquired from each transmission device 200. When it is determined in Step S56 that the transmission of the video has ended (Step S56: Yes), the target transmission rate setting unit 504 ends the processing. When it is not determined in Step S56 that the transmission of the video has ended (Step S56: No), the processing returns to Step S52, and the processing of Step S52 and the subsequent steps is repeated. Thus, the target transmission rates of the plurality of pieces of data transmitted from the plurality of transmission devices 200 are set.

FIG. 15 is a diagram illustrating a state in which the bandwidth of data is switched according to a change in the role of the data.

In the example of FIG. 15, the number of cameras is four. Video data output from the four cameras (Cam #0, Cam #1, Cam #2, and Cam #3) are transmitted through the same transmission path. The allocation ratio of the band of each data is dynamically adjusted based on the first band control.

At time t0, the data of Cam #0 is an "On-Air video", and the data of Cam #1 is a "Next video". More bandwidth is allocated to the data of Cam #0 and the data of Cam #1 than to the other data.

Then, at time t1, the role of each data is changed and the data of Cam #1 is an "On-Air video", and the data of Cam #3 is a "Next video". Due to the change in the role of each data, more bandwidth is allocated to the data of Cam #1 and the data of Cam #3 than to the other data.

Then, at time t2, the role of each data is changed again and the data of Cam #3 is an "On-Air video", and the data of Cam #2 is a "Next video". Due to the change in the role of each data, more bandwidth is allocated to the data of Cam #3 and the data of Cam #2 than to the other data.

With this processing, a deterioration in image quality of a video to be broadcast or distributed is reduced, and a live video with high image quality is produced when a plurality of pieces of video data are transmitted in a limited transmission band.

[5. Effects]

The controller 500 includes the data classification unit 503 and the target transmission rate setting unit 504. The data classification unit 503 classifies the plurality of pieces of data transmitted via the network 300 into one or more groups, based on the sharing state of the communication resource between the data. The target transmission rate setting unit 504 sets, for each group, the target transmission rate of each data belonging to the group based on a setting reference of the target transmission rate defined for each group. In the information processing method of the present embodiment, the above-described information processing of the controller 500 is executed by a computer.

With this configuration, the communication resource is efficiently allocated to the plurality of pieces of data based on the sharing state of the communication resource. As a result, the communication resource is effectively utilized.

The controller 500 includes the sharing state determination unit 502. The sharing state determination unit 502 determines the sharing state of the communication resource between the data in the network 300 based on the transmission path of each data in the network 300. The data classification unit 503 classifies the plurality of pieces of data determined by the sharing state determination unit 502 to share the communication resource into the same group.

With this configuration, the sharing state of the communication resource between the data is accurately determined.

The sharing state determination unit 502 determines that a plurality of pieces of data whose type of the network 300 and parameter of the network 300 coincide with each other share the communication resource.

With this configuration, the sharing state of the communication resource between the data is easily determined.

If there is a correlation in the change in the communication resource used between a plurality of pieces of data whose type of the network 300 and parameter of the network 300 do not coincide with each other, the sharing state determination unit 502 determines that the plurality of pieces of data share the communication resource.

With this configuration, information on the sharing state of the communication resource that cannot be found only from the information on the type of the network 300 and the parameter of the network 300 is detected.

The data classification unit 503 classifies a plurality of pieces of data belonging to the same group and having a correlation in the change in the communication resource used into the first group in which the allocation ratio of the communication resource can be controlled between the data. The target transmission rate setting unit dynamically changes the target transmission rate of each data belonging to the first group according to the role of each data.

With this configuration, the communication resource is efficiently allocated according to the role of the data.

The data classification unit classifies a plurality of pieces of data belonging to the same group and having no correlation in the change in the communication resource used into the second group in which the allocation ratio of the communication resource cannot be controlled between the data. The target transmission rate setting unit sets the target transmission rate of all the data belonging to the second group based on a fixed ratio regardless of the role of each data.

With this configuration, a necessary communication resource is secured for each data under a situation where the allocation of the communication resource cannot be controlled.

The information processing system 1 includes the plurality of transmission devices 200 and the controller 500. The controller 500 sets the target transmission rate of each of the plurality of pieces of data transmitted from the plurality of transmission devices 200.

With this configuration, necessary data can be transmitted at a high transmission rate. Therefore, a high-quality video can be produced with a limited communication resource.

The effects described herein are merely examples and are not subject to limitations, and other effects may be provided.

The present technique may also have the following configurations:

(1)

An information processing device comprising:
 a data classification unit that classifies a plurality of pieces of data transmitted via a network into one or more groups based on a sharing state of a communication resource between the data; and
 a target transmission rate setting unit that sets, for each group, a target transmission rate of each data belonging to the group based on a setting reference of the target transmission rate defined for each group.

(2)

The information processing device according to (1), further comprising:
 a sharing state determination unit that determines a sharing state of the communication resource between the data in the network based on a transmission path of each data in the network,
 wherein the data classification unit classifies a plurality of pieces of data determined by the sharing state determination unit to share the communication resource into the same group.

(3)

The information processing device according to (2),
 wherein the sharing state determination unit determines that a plurality of pieces of data whose type of the network and parameter of the network coincide with each other share the communication resource.

(4)

The information processing device according to (3), wherein, if there is a correlation in a change in a communication resource used between a plurality of pieces of data whose type of the network and parameter of the network do not coincide with each other, the sharing state determination unit determines that the plurality of pieces of data share the communication resource.

(5)

The information processing device according to (2), wherein the data classification unit classifies a plurality of pieces of data belonging to the same group and having a correlation in a change in the communication resource used into a first group in which an allocation ratio of the communication resource can be controlled between the data.

(6)

The information processing device according to (5), wherein the target transmission rate setting unit dynamically changes a target transmission rate of each data belonging to the first group according to a role of each data.

(7)

The information processing device according to (2), wherein the data classification unit classifies a plurality of pieces of data belonging to the same group and having no correlation in a change in the communication resource used into a second group in which an allocation ratio of the communication resource cannot be controlled between the data.

(8)

The information processing device according to (7), wherein the target transmission rate setting unit sets a target transmission rate of all data belonging to the second group based on a fixed ratio regardless of a role of each data.

(9)

An information processing system comprising:
a plurality of transmission devices; and
the information processing device according to any one of (1) to (8) that sets each of target transmission rates of a plurality of pieces of data transmitted from the plurality of transmission devices.

(10)

An information processing method executed by a computer, the method comprising:
classifying a plurality of pieces of data transmitted via a network into one or more groups based on a sharing state of a communication resource between the data; and
setting, for each group, a target transmission rate of each data belonging to the group based on a setting reference of the target transmission rate defined for each group.

(11)

The information processing method according to (10), wherein a step of classifying the plurality of pieces of data is to determine a sharing state of the communication resource between data in the network based on a transmission path of each data in the network, and to classify the plurality of pieces of data determined to share the communication resource into the same group.

(12)

The information processing method according to (11), wherein a step of determining the sharing state is to determine that a plurality of pieces of data whose type of the network and parameter of the network coincide with each other share the communication resource.

(13)

The information processing method according to (12), wherein the step of determining the sharing state is to, if there is a correlation in a change in a communication resource used between a plurality of pieces of data whose type of the network and parameter of the network do not coincide with each other, determine that the plurality of pieces of data share the communication resource.

(14)

The information processing method according to (11), wherein a step of classifying the plurality of pieces of data is to classify a plurality of pieces of data belonging to the same group and having a correlation in a change in the communication resource used into a first group in which an allocation ratio of the communication resource can be controlled between the data.

(15)

The information processing method according to (14), wherein a step of setting the target transmission rate is to dynamically change a target transmission rate of each data belonging to the first group according to a role of each data.

(16)

The information processing method according to (11), wherein the step of classifying the plurality of pieces of data is to classify a plurality of pieces of data belonging to the same group and having no correlation in a change in the communication resource used into a second group in which an allocation ratio of the communication resource cannot be controlled between the data.

(17)

The information processing method according to (16), wherein the step of setting the target transmission rate is to set a target transmission rate of all data belonging to the second group based on a fixed ratio regardless of a role of each data.

REFERENCE SIGNS LIST

1 INFORMATION PROCESSING SYSTEM
200 TRANSMISSION DEVICE
300 NETWORK
500 CONTROLLER (INFORMATION PROCESSING DEVICE)
502 SHARING STATE DETERMINATION UNIT
503 DATA CLASSIFICATION UNIT
504 TARGET TRANSMISSION RATE SETTING UNIT

The invention claimed is:

1. An information processing device comprising:
a data classification unit configured to classify a plurality of pieces of data transmitted via a network into one or more groups based on a sharing state of a communication resource between the data, the communication resource including a band; and
a target transmission rate setting unit configured to set, for each group, a target transmission rate of each data belonging to the group based on a setting reference of the target transmission rate defined for each group,
wherein the data classification unit and the target transmission rate setting unit are each implemented via at least one processor.

2. The information processing device according to claim 1, further comprising:

a sharing state determination unit configured to determine the sharing state of the communication resource between the data in the network based on a transmission path of each data in the network, wherein the data classification unit classifies the plurality of pieces of data transmitted via the network determined by the sharing state determination unit to share the communication resource into a same group, and wherein the sharing state determination unit is implemented via at least one processor.

3. The information processing device according to claim 2, wherein the sharing state determination unit determines that the plurality of pieces of data whose type of the network and parameter of the network coincide with each other share the communication resource.

4. The information processing device according to claim 3, wherein, when it is determined that there is a correlation in a change in a communication resource used between a plurality of pieces of data whose type of the network and parameter of the network do not coincide with each other, the sharing state determination unit determines that the plurality of pieces of data share the communication resource.

5. The information processing device according to claim 2, wherein the data classification unit classifies the plurality of pieces of data belonging to the same group and having a correlation in a change in the communication resource used into a first group in which an allocation ratio of the communication resource can be controlled between the data.

6. The information processing device according to claim 5, wherein the target transmission rate setting unit dynamically changes a is further configured to dynamically change the target transmission rate of each data belonging to the first group according to a role of each data.

7. The information processing device according to claim 2, wherein the data classification unit classifies the plurality of pieces of data belonging to the same group and having no correlation in a change in the communication resource used into a second group in which an allocation ratio of the communication resource cannot be controlled between the data.

8. The information processing device according to claim 7, wherein the target transmission rate setting unit sets the target transmission rate of all data belonging to the second group based on a fixed ratio regardless of a role of each data.

9. An information processing system comprising:
a plurality of transmission devices; and
an information processing device including
a data classification unit configured to classify a plurality of pieces of data transmitted via a network into one or more groups based on a sharing state of a communication resource between the data, the communication resource including a band, and
a target transmission rate setting unit configured to set, for each group, a target transmission rate of each data belonging to the group based on a setting reference of the target transmission rate defined for each group, wherein the information processing device sets each of target transmission rates of a plurality of pieces of data transmitted from the plurality of transmission devices, and wherein the data classification unit and the target transmission rate setting unit are each implemented via at least one processor.

10. An information processing method executed by a computer, the method comprising:
classifying a plurality of pieces of data transmitted via a network into one or more groups based on a sharing state of a communication resource between the data, the communication resource including a band; and
setting, for each group, a target transmission rate of each data belonging to the group based on a setting reference of the target transmission rate defined for each group.

11. The information processing method according to claim 10, wherein classifying the plurality of pieces of data includes determining a sharing state of the communication resource between data in the network based on a transmission path of each data in the network, and to classify the plurality of pieces of data determined to share the communication resource into the same group.

12. The information processing method according to claim 11, wherein determining the sharing state includes determining that a plurality of pieces of data whose type of the network and parameter of the network coincide with each other share the communication resource.

13. The information processing method according to claim 12, wherein determining the sharing state includes, when it is determined that there is a correlation in a change in a communication resource used between a plurality of pieces of data whose type of the network and parameter of the network do not coincide with each other, determining that the plurality of pieces of data share the communication resource.

14. The information processing method according to claim 11, wherein classifying the plurality of pieces of data includes classifying a plurality of pieces of data belonging to the same group and having a correlation in a change in the communication resource used into a first group in which an allocation ratio of the communication resource can be controlled between the data.

15. The information processing method according to claim 14, wherein setting the target transmission rate includes dynamically changing a target transmission rate of each data belonging to the first group according to a role of each data.

16. The information processing method according to claim 11, wherein classifying the plurality of pieces of data includes a plurality of pieces of data belonging to the same group and having no correlation in a change in the communication resource used into a second group in which an allocation ratio of the communication resource cannot be controlled between the data.

17. The information processing method according to claim 16, wherein setting the target transmission rate includes setting a target transmission rate of all data belonging to the second group based on a fixed ratio regardless of a role of each data.

* * * * *